(12) United States Patent
Weber

(10) Patent No.: US 7,690,119 B1
(45) Date of Patent: Apr. 6, 2010

(54) WATER CLOSET BOLT CUTTER

(76) Inventor: Paul Alan Weber, P.O. Box 321, Forest Knolls, CA (US) 94933

( * ) Notice: Subject to any disclaimer, the term of this patent is extended or adjusted under 35 U.S.C. 154(b) by 341 days.

(21) Appl. No.: 11/715,183

(22) Filed: Mar. 6, 2007

(51) Int. Cl.
*B26B 17/00* (2006.01)

(52) U.S. Cl. .............................. 30/193; 30/187; 30/192; 30/251

(58) Field of Classification Search ........................ 30/1, 30/182, 184, 186–188, 190, 193, 244, 251, 30/90.1, 91.2, 93–95, 111, 113, 278
See application file for complete search history.

(56) References Cited

U.S. PATENT DOCUMENTS

| | | | | |
|---|---|---|---|---|
| 1,592,017 A | * | 7/1926 | Van Campen | 30/180 |
| 1,643,589 A | * | 9/1927 | Schwindt | 30/182 |
| 4,069,582 A | * | 1/1978 | Kearns | 30/182 |
| 4,249,308 A | * | 2/1981 | Boyajian | 30/231 |
| 4,868,986 A | * | 9/1989 | Olson et al. | 30/193 |
| 5,862,597 A | * | 1/1999 | Juros | 30/191 |
| 2008/0163494 A1 | * | 7/2008 | Larkin | 30/187 |

\* cited by examiner

*Primary Examiner*—Phong H Nguyen
(74) *Attorney, Agent, or Firm*—Risto A. Rinne, Jr.

(57) ABSTRACT

An apparatus for cutting a bolt includes a first member and a second member that are adapted to pivot about an axis. An L-shaped member is pivotally attached to an end of the second member. A sliding member is attached to the L-shaped member that bears on an exterior of the first member when the L-shaped member is fully pivoted toward the first member. A threaded rod includes a first end that is attached to the sliding member. The threaded rod engages with a threaded opening provided in the L-shaped member. A knob that is attached to the threaded rod is tightened which urges the sliding member and the first member toward the second member and severs the bolt that is disposed in a pair of openings proximate the axis.

9 Claims, 1 Drawing Sheet

WATER CLOSET BOLT CUTTER

BACKGROUND OF THE INVENTION

1. Field of the Invention

The present invention, in general, relates to toilets and, more particularly, to the cutting of a closet bolt that secures a toilet to a floor.

Toilets are well-known. Closet bolts are similarly well-known and the most common types consist of a threaded one-quarter inch rod of a predetermined length. Closet bolts are used to secure the toilet to a flange on the floor.

A lower end of each closet bolt cooperates with an opening that is provided in the flange, thereby preventing the lower end of the closet bolt from being pulled up and apart from the flange. A nut or other means, for example having a lower portion of the closet bolt cooperate with a threaded-opening in the flange, are possible ways of securing the lower end of the closet bolt to the flange.

Typically, one closet bolt is disposed on a left side of a base of the toilet and another closet bolt is disposed on a right side of the base. Each closet bolt typically passes through an opening that is provided in the base. The nut is used with each closet bolt and is tightened to secure the base proximate the floor. This type of an installation is well-known in the plumbing arts.

The closet bolts tend to protrude up from the floor an amount sufficient to permit their use in most situations. In particular, each closet bolt must extend sufficiently high to permit an initial threading of a nut onto an upper end of the closet bolt after the upper end has first passed through one of the openings provided in the base.

After the closet bolts are tightened they tend to protrude up from the base an excessive and unsightly amount. The amount is excessive because too long of a protrusion above the base prevents proper placement of a decorative cap that is usually affixed atop the upper end of the closet bolt and over the nut.

The decorative cap is used to complete the aesthetic requirements of the installation. If the protrusion is excessive, the decorative cap cannot be properly placed over the nut and the upper end of the closet bolt. It will be too high and a gap will exist between a bottom of the decorative cap and a top surface of the base.

This necessitates cutting off a portion of the upper end of the closet bolt prior to placing the decorative cap thereon. It is important to understand that this operation cannot be accomplished until after the toilet has been fully and properly secured in position by the closet bolts. It is likely that each closet bolt, having pulled the base further downward during tightening of the nut, will require cutting. Therefore, the closet bolts cannot be "pre-cut". They must be cut in position after the nuts have been fully tightened.

The most common way this is accomplished in the field is by the use of an old-fashioned hacksaw. However, this approach has certain serious drawbacks and potential deleterious consequences associated therewith.

For example, toilets are often mounted close to a wall or partition. In general, access to the upper ends of the closet bolts is limited. Sometimes, there is not enough room to use a hacksaw effectively.

Also, cutting the closet bolts with a hacksaw is time-consuming. This adds time to the installation which translates into higher installation costs for the consumer or lower profits for the installer (i.e., the plumber).

Perhaps the worst potential consequence is that, when working in an awkward posture and in tight quarters, it is easy for the hacksaw to slip off of the upper end of the closet bolt and strike some other portion of the base of the toilet. When this happens, the hacksaw is apt to mar, sometimes grossly, the finish of the base.

Aesthetics is a prime factor that motivates most people to remodel their bathroom. As such, most consumers will not tolerate a visible scratch on the base of their newly installed toilets. The installer must then remove the damaged toilet, order a new one, absorb the cost of the damaged one, and schedule yet another time to complete installation. It is important to note that the risk of a subsequent slippage and damaging yet another toilet does not go away during successive installation attempts.

There is also risk that if the hacksaw should slip off of the closet bolt during a cutting thereof, that the blade might contact some portion of the installer, thereby possibly causing injury.

It is clear that the use of a hacksaw to cut off the upper ends of closet bolts can prove to be especially costly, both in time and money, to an installer (i.e., plumbing contractor).

Other systems, as described hereinafter, are used to install toilets, also known as a "water closet" in the field. However, these systems are expensive, complex, and generally difficult to use.

Also, other prior art attempted solutions have failed to sufficiently mitigate the problems of water closet (i.e., toilet) installation because they too tend to be excessively large. A small, compact solution to the problem has been elusive because of either the need for a saw or the need to supply great mechanical advantage to sever the closet bolts. These needs have heretobefore produced heavy or cumbersome devices that have exhibited limited capabilities.

It is important to note that plumbers, aware of the tight quarters that they often find themselves working in, will not be inclined to purchase large or heavy equipment. That is why the lightweight hacksaw, with its many problems and disadvantages, has remained to this day the tool and method of choice for cutting off the upper ends (i.e., the tops) of closet bolts.

There is another problem that occurs when a hacksaw or when other prior art tools and methods are used to cut or sever an upper portion of a closet bolt. That problem is that the threads of the closet bolt can become damaged. This can make removal of the nut apart from the remaining portion of the upper end especially difficult to accomplish.

Then, when removal of the water closet (i.e., toilet) is required, the marred threads can greatly extend the amount of work and the time that is required to do so. This, also adds to the cost of repairs or improvements.

There is still a further problem associated with the cutting of a closet bolt by a hacksaw and that is that the metal filings that occur during cutting must be picked up off of the floor, lest they be stepped on and potentially damage the floor. This takes additional time to accomplish after cutting the two closet bolts that are typically used.

Additionally, there is a need to be able to cut the closet bolt as low and as close as possible to the nut so as to allow placement of the decorative cap over the nut (if used) and remaining portion of the closet bolt.

Accordingly, there exists today a need for a water closet bolt cutter that helps to ameliorate the above-mentioned problems and difficulties as well as ameliorate those additional problems and difficulties as may be recited in the "OBJECTS AND SUMMARY OF THE INVENTION" or discussed elsewhere throughout the specification.

Clearly, such an apparatus would be a useful and desirable device.

2. Description of Prior Art

Toilet installation systems are, in general, known. For example, the following patents describe various types of these devices:

U.S. Pat. No. 5,421,036 to Stevens et al., Jun. 6, 1995; and
U.S. Pat. No. 4,194,286 to Kearns, Mar. 25, 1980;
U.S. Pat. No. 2,560,318 to Wenger that issued Jul. 10, 1951 describes a type of bolt cutter.

While the structural arrangements of the above described devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a water closet bolt cutter that is inexpensive.

It is also an important object of the invention to provide a water closet bolt cutter that is easy to use.

Another object of the invention is to provide a water closet bolt cutter that is safe to use.

Still another object of the invention is to provide a water closet bolt cutter that can fit into tight spaces.

Still yet another object of the invention is to provide a water closet bolt cutter that is able to cut (i.e., sever) an upper portion of a closet bolt when the closet bolt is secured to a base of toilet.

Yet another important object of the invention is to provide a water closet bolt cutter that helps to prevent damage from occurring to the water closet (i.e., toilet) during cutting (i.e., severing) of an upper portion of the closet bolt.

Still yet another important object of the invention is to provide a water closet bolt cutter that helps to prevent injury from occurring to an installer during use.

A first continuing object of the invention is to provide a water closet bolt cutter that includes a compact mechanical advantage to increase ability to sever an upper portion of a closet bolt.

A second continuing object of the invention is to provide a water closet bolt cutter that helps to prevent damage from occurring to the threads of a remaining portion of a closet bolt during a cutting or severing thereof.

A third continuing object of the invention is to provide a water closet bolt cutter that is lightweight.

A fourth continuing object of the invention is to provide a water closet bolt cutter that provides a sufficient mechanical advantage to sever a closet bolt.

A fifth continuing object of the invention is to provide a water closet bolt cutter that provides for the controlled application of a force to sever a closet bolt.

A sixth continuing object of the invention is to provide a water closet bolt cutter that does not produce filings when cutting a closet bolt.

A seventh continuing object of the invention is to provide a water closet bolt cutter that permits cutting a closet bolt as close to a base of a water closet as is desired.

Briefly, a water closet bolt cutter that is constructed in accordance with the principles of the present invention has a first and a second member that are each pivotally attached about an axis at one end thereof with respect to each other. A first opening is provided through the first member that aligns concentrically with a second opening that is provided through the second member when an opposite end of each of the members is disposed in a predetermined spaced-apart orientation with respect to each other. At that time the water closet bolt cutter can be placed over a water closet bolt with the bolt passing through both the first and the second openings until a plane that is disposed between the first and the second openings is at a proper elevation above a base of a water closet. Each of the first and second openings includes a flat side and an opposite angled side. The angled side forms a blade that is used to cut (i.e., sever) the closet bolt when sufficient force is applied to pivot the opposite ends of each of the members toward each other. The flat side of the first member is disposed on the same side as is the angled side of the second member. The angled side of the first member is disposed on the same side as the flat side of the second member. The opposite end of the first member includes an opening. A pin passes through the opening and pivotally attaches a first end of an L-shaped member thereto. An opposite end of the L-shaped member includes a shorter portion that is disposed at a ninety degree angle with respect to a longer portion of the L-shaped member. A threaded rod is threaded to the shorter portion at the opposite end of the L-shaped member and passes therethrough. A remaining end of the threaded rod is attached to a sliding member. The sliding member includes on one side thereof a roller that bears against a portion of an outside of the opposite end of the second member when the L-shaped member is fully pivoted toward the first and the second openings (i.e., toward the closet bolt). The sliding member is adapted to slide longitudinally along a length of the L-shaped member and to bear on the opposite end of the second member. A knob that is attached to the threaded rod is turned to tighten the threaded rod and to urge the sliding member, and therefore also opposite end of the second member, closer toward the opposite end of the first member, thereby safely severing the closet bolt.

DETAILED DESCRIPTION OF THE INVENTION

Figure 1:
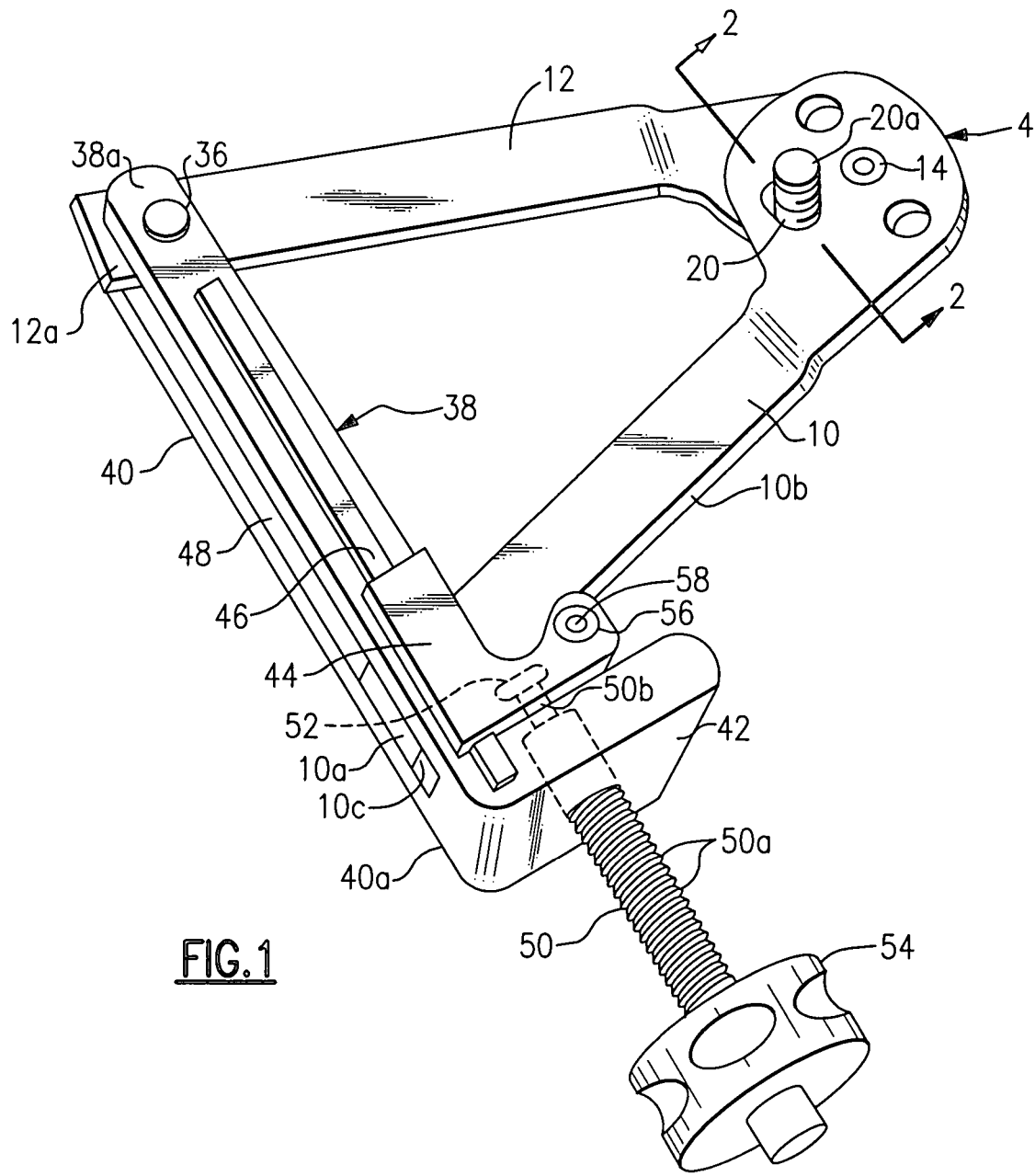
FIG. 1 is a view in perspective of a water closet bolt cutter properly disposed over a closet bolt, prior to a cutting (severing) thereof.
Figure 2:
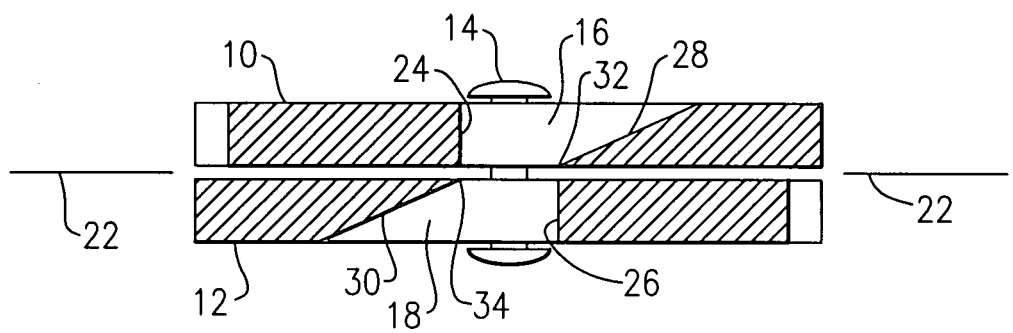
FIG. 2 is an enlarged cross-sectional view taken on the line 2-2 in FIG. 1 with a closet bolt removed from the FIG. 1 drawing for clarity.

Referring now primarily to FIG. 1, and on occasion also to FIG. 2, is shown a water closet bolt cutter, identified in general by the reference numeral 4.

The water closet bolt cutter 4 has a first member 10 and a second member 12 that are each pivotally attached about a rivet 14 at one end thereof with respect to each other. The rivet 14 creates an axis about which the first member 10 and the second member 12 are able to pivot with respect to each other.

A first opening 16 (FIG. 2) is provided through the first member that aligns concentrically with a second opening 18 (FIG. 2) that is provided through the second member when a first opposite end 10a and a second opposite end 12a of each of the first and second members 10, 12, respectively, are disposed in a predetermined spaced-apart orientation, as shown in FIG. 1, with respect to each other.

When the water closet bolt cutter 4 is disposed as shown it can be placed over a water closet bolt 20 with the water closet bolt 20 passing through both the first and the second openings 16, 18 until a plane 22 (FIG. 2) that is disposed between the first and the second openings 16, 18 is at a proper elevation above a base of a water closet (not shown).

The first opening 16 includes a first flat side 24 and the second opening 18 includes a second flat side 26. A first angled side 28 is disposed opposite the first flat side 24 of the first opening 16. A second angled side 30 is disposed opposite the second flat side 26 of the second opening 18.

The first angled side 28 terminates nearest the rivet 14 to provide a first cutting edge 32. The second angled side 30 terminates nearest the rivet 14 to provide a second cutting edge 34.

The first and second cutting edges 32, 34 face each other and are both disposed along the plane 22. For the purpose of clarity, an exaggerated gap is shown between the first member 10 and the second member 12 in the FIG. 2 drawing that does not actually exist. The rivet 14, when properly applied during manufacture, ensures that a bottom surface (as shown in FIG. 2) of the first member 10 will be disposed so that it is flush against a top surface of the second member 12.

Therefore, both surfaces will align with the plane 22 thereby disposing a beginning portion of the first and second cutting edges 32, 34 also on the plane 22. The first and second cutting edges 32, 34 act as a first and second blade respectively, to sever the closet bolt 20, as is described in greater detail hereinafter.

The first and second cutting edges 32, 34 preferably each include a hardened surface so that they are harder than the metal (or other substance) used to form the closet bolt 20.

The first flat side 24 of the first member 10 is disposed on the same side as is the second angled side 30 of the second member 12. The first angled side 28 of the first member 10 is disposed on the same side as is the second flat side 26 of the second member 12.

In order to cut (i.e., sever) the closet bolt 20, a sufficient amount of force must applied to pivot the first opposite end 10a of each of the first member 10 toward the second opposite end 12a of the second member 12. This has heretobefore not been possible to accomplish for such an application.

This is because if a conventional bolt cutter (not shown) that had sufficient mechanical advantage necessary for a person to sever the closet bolt 20 were to be used, the length of each of the members 10, 12 would have to be long in order to generate the necessary mechanical advantage. This would then preclude placement over the closet bolt 20, especially in tight quarters near walls or partitions or other obstructions.

The instant invention provides the necessary mechanical advantage for use in especially tight quarters. Furthermore, the application of the force to sever the closet bolt 20 is accomplished in a controlled manner whereby there is no possibility of slipping off of the closet bolt 20, damaging the water closet (toilet), or of causing harm to the installer or any surrounding structures. This is described in greater detail below.

A pin 36 passes through an opening that is provided in the second member 12 proximate the second opposite end 12a, thereof. The pin 36 provides a second axis about which a first end 38a of an L-shaped member, identified in general by the reference numeral 38, is pivotally attached thereto. The pin 36 also secures the first end 38a of the L-shaped member 38 to the second member 12.

Commencing at the first end 38a of the L-shaped member 38 and extending slightly beyond the first opposite end 10a of the first member 10, is included a longer leg portion 40 of the L-shaped member 38.

The longer leg portion 40 includes an opposite end 40a. A shorter leg portion 42 is attached to the opposite end 40a and is disposed at a ninety degree angle with respect to the longer leg portion 40 of the L-shaped member 38.

A sliding member 44 is secured to the L-shaped member 38 whereby it is adapted to engage with a longitudinal first recess 46 that is provided in the longer leg portion 40.

The sliding member 44 is adapted to slide along the longitudinal length of the L-shaped member 38 from the shorter leg portion 42 to the second member 12.

A longitudinal second recess 48 is provided in the longer leg portion 40 that is perpendicular with respect to the longitudinal first recess 46. The longitudinal second recess 48 extends from the first end 38a of the L-shaped member 38 to the shorter leg portion 42.

The longitudinal second recess 48 provides a planar opening that extends across the width of the longer leg portion 40 that generally aligns with a plane of the first member 10. The longitudinal second recess 48 is slightly greater in thickness than that of the first member 10. This provides a clearance that is sufficient to allow the first opposite end 10a of the first member 10 to pass therethrough.

This, in turn, allows the first opposite end 10a to slide along the longitudinal length of the longitudinal second recess 48 from the shorter leg portion 42 to the second member 12, when the L-shaped member 38 is disposed as shown. The longitudinal second recess 48 also retains the second member 12 in the L-shaped member 38 during use, as is described in greater detail hereinafter, when actually severing (i.e., cutting) the closet bolt 20.

A threaded rod 50 includes screw threads 50a that are cooperatively engaged with corresponding screw threads that are provided in the shorter leg portion 42. A first end 50b of the threaded rod 50 is attached to a dish-shaped termination 52. The dish-shaped termination 52 is disposed in an opening provided in the sliding member 44.

Accordingly, as the threaded rod 50 is rotated, the dish-shaped termination 52 is able to rotate about a longitudinal center axis of the threaded rod 50 in the opening that is provided in the sliding member 44, and is retained therein.

When the threaded rod 50 is tightened, the sliding member 44 is urged toward the second member 12. When the threaded rod 50 is loosened, the sliding member 44 is urged away from the second member 12. A knob 54 is attached to threaded rod 50 at an end therefore that is opposite with respect to the first end 50b of the threaded rod 50. The knob 54 is used for turning of the threaded rod 50.

The screw threads 50a provide effectively an inclined plane that provides great mechanical advantage in urging the sliding member 44, and therefore also the first member 10, toward the second member 12. This mechanical advantage allows the installer to easily rotate the knob 54 and sever, in a controlled and safe manner, the closet bolt 20 by urging the first member 10 toward the second member 12.

The urging of the first member 10 toward the second member 12, in turn, causes the first cutting edge 32 and the second cutting edge 34 to simultaneously begin to move toward each other and therefore after sufficient tightening of the knob 54 has occurred, to fully sever an upper portion 20a from the closet bolt 20. The upper portion 20a is that portion of the closet bolt 20 that is disposed above the plane 22.

According to the instant configuration, the cutting of the closet bolt 20 begins simultaneously from opposite sides (i.e., across the diameter) of the closet bolt 20. This has substantial advantages.

The first flat side 24 provides a planar surface to distribute the forces that are being applied specifically by the first cutting edge 32 to the closet bolt 20. The second flat side 26 provides a planar surface to distribute the forces that are being applied specifically by the second cutting edge 32 to the closet bolt 20.

This is different than, for example, placing a longer flat side on one side and a cutting edge (only one) on an opposite side or of placing two cutting edges on opposite sides of a conventional type (not shown) of bolt cutter.

The instant mechanical configuration provides the unexpected benefit of better distributing the forces that are being applied to the closet bolt 20 during cutting which, in turn, helps to prevent damage from occurring to the threads of the closet bolt 20. This allows for easier removal of a nut (not shown) that is threaded to the closet bolt 20 and is used to retain the water closet adjacent to a floor. This provides for far easier disassembly at a later time, as may be required.

To use the water closet bolt cutter 4, the knob 54 is rotated fully counter-clockwise to draw the sliding member 44 up to the shorter leg portion 42. This is important in that it allows for the L-shaped member 38 to be pivoted in a direction that is generally toward the rivet 14 and for the first opposite end 10a of the first member 10 to be placed in the second longitudinal recess 48.

The first opposite end 10a is then urged fully toward the sliding member 44 while it is disposed in the second longitudinal recess 48 until an exterior surface 10b of the first member 10 contacts a roller 56 that is attached to the sliding member 44 about a third axis 58. The knob 54 is then loosened until the sliding member 44 is in contact with the shorter leg portion 42.

At this time, the first opening 16 and the second opening 18 will be in concentric alignment sufficient to allow placement of the water closet bolt cutter 4 over the closet bolt 20 and a lowering of the water closet bolt cutter 4 down over the closet bolt 20 until the plane 22 is at the desired height.

It is important to note also that the plane 22 is where the closet bolt 20 will be severed (i.e., cut) and that this location can, if desired, be as close to a nut (not shown) as is the thickness of either the first member 10 or the second member 12 (depending on which side is facing down). This allows close trimming of the closet bolt 20 and easy placement of a decorative cap (not shown) over a remaining portion of the closet bolt 20.

As force is applied by the sliding member 44 to the exterior surface 10b of the first member 10 by the roller 56, the roller 56 is able to rotate about the third axis 58. When the first member 10 is urged closer toward the second member 12, the location on the exterior surface 10b (i.e., where the force is being applied by the roller 56) changes. The roller 56 smoothly applies that force to the changing position along a longitudinal length of the exterior surface 10b.

This provides a smoother-feeling and more controlled cutting operation requiring less force to be exerted by a user of the water closet bolt cutter. The roller 56 also prevents gouging (i.e. damage) from occurring to the exterior surface 10b during use.

It is important to note that another unexpected and especially significant benefit is provided by this configuration during cutting of the closet bolt 20. To cut the closet bolt 20, as described above, the first member 10 is placed in the second longitudinal recess 48 and urged until it contacts the roller 56 and the sliding member 44 is urged until it is adjacent the shorter leg portion. Then the first opening 16 and the second opening 18 are placed over the closet bolt 20 to a proper location along the longitudinal length of the closet bolt 20 for cutting to occur.

At this time, the first member 10 automatically becomes secured in the second longitudinal recess 48 because the roller 56 is disposed at a lower position (along the plane of the first member 10) than is an end 10c of the second member 10.

The knob 54 is then rotated (clockwise) until the upper portion 20a of the closet bolt 20 has been fully severed. The water closet bolt cutter 4 and the upper portion 20a of the closet bolt 20 are removed from under the water closet.

Now, in a less cramped condition, the user (i.e., installer or plumber) is able to rotate the knob 54 in a counter-clockwise direction an amount sufficient to urge the sliding member 44 back in contact with the shorter leg portion 42. The water closet bolt cutter 4 is now ready for the next usage.

The L-shaped member 38, the sliding member 44, the threaded rod 50, and the knob 54 together provide a means for urging the first member 10 toward the second member 12. The knob 54 receives a first force that is applied thereto by a user and the sliding member 44, in response, applies a second force to the first member 10 that is greater in magnitude than is the first force. Accordingly, the L-shaped member 38, the sliding member 44, the threaded rod 50, and the knob 54 cooperate with the first member 10 and the second member 12 to provide a mechanical advantage that allows for easy severing of the closet bolt 20.

If desired, during use the first opposite end 10a can be left in the second longitudinal recess 48 or it can be removed therefrom by pivoting the L-shaped member 38 about the pin 36 in a direction that is generally away from the rivet 14.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A bolt cutter for cutting a water closet or other type of a bolt, comprising:
 (a) a first member;
 (b) a second member pivotally attached about an axis to said first member;
 (c) first means for cutting said bolt attached to said first member; and
 (d) means for urging at least a portion of said first member toward said second member, and wherein said means for urging provides a mechanical advantage, and wherein said means for urging receives a first force that is applied to a portion thereof and, in response to said first force, applies a second force to said first member;
 wherein said means for urging includes a generally L-shaped member that is attached to an end of said second member that is distally disposed with respect an end of said second member that is pivotally attached to said first member, and wherein a threaded rod includes screw threads that are adapted to cooperate with said L-shaped member and wherein a first end of said threaded rod is attached to a sliding member, and wherein said sliding member adapted to be urged longitudinally along a length of said L-shaped member, and wherein when said threaded rod is turned in a first direction, said threaded rod is adapted to urge said sliding member toward said second member, and wherein when said threaded rod is turned in an opposite second direction, said threaded rod is adapted to urge said sliding member away from said second member, and wherein when said threaded rod is turned in said first direction said sliding member is adapted to urge said first member and said second member toward each other an amount that is sufficient to sever said bolt.

2. The bolt cutter of claim 1 wherein said first means for cutting includes a first opening and wherein said first opening includes a blade disposed on a first side thereof and a flat surface disposed on an opposite second side thereof.

3. The bolt cutter of claim 1 including second means for cutting said bolt attached to said second member.

4. The bolt cutter of claim 3 wherein said first means for cutting includes a first opening and wherein said first opening includes a blade disposed on a first side thereof and a flat surface disposed on an opposite second side thereof.

5. The bolt cutter of claim 3 wherein said second means for cutting includes a second opening and wherein said second opening includes a blade disposed on a first side thereof and a flat surface disposed on an opposite second side thereof.

6. The bolt cutter of claim 3 wherein said first means for cutting includes a first opening and wherein said first opening includes a blade disposed on a first side thereof and a flat surface disposed on an opposite second side thereof, and wherein said second means for cutting includes a second opening and wherein said second opening includes a blade disposed on a first side thereof and a flat surface disposed on an opposite second side thereof.

7. The bolt cutter of claim 1 including a knob attached to an end of said threaded rod that is disposed distally from said first end thereof.

8. The bolt cutter of claim 1 wherein said L-shaped member includes a longer portion and a shorter portion, and wherein said screw threads of said threaded rod are adapted to cooperate with corresponding inside screw threads that are disposed in an opening provided in said shorter portion of said L-shaped member.

9. The bolt cutter of claim 1 wherein said sliding member includes a roller that is adapted to bear on an exterior surface of said first member.

* * * * *